United States Patent [19]

Olson et al.

[11] 4,445,265
[45] May 1, 1984

[54] SHRINK GRIP DRILL PIPE FABRICATION METHOD

[75] Inventors: Wallace F. Olson, Eufaula, Okla.; Ned Rodgers, Midland, Tex.

[73] Assignee: Smith International, Inc., Newport Beach, Calif.

[21] Appl. No.: 215,809

[22] Filed: Dec. 12, 1980

[51] Int. Cl.³ .............................................. B23P 11/02
[52] U.S. Cl. ................................ 29/447; 29/DIG. 35; 228/112; 285/286; 285/381
[58] Field of Search .................... 29/DIG. 35, 447; 228/115, 112; 285/286, 381

[56] References Cited

U.S. PATENT DOCUMENTS

| | | | |
|---|---|---|---|
| 2,054,118 | 9/1936 | Childs et al. | 29/447 X |
| 2,161,568 | 6/1939 | Gignoux | 285/381 X |
| 2,535,320 | 12/1950 | Richardson | 29/447 X |
| 2,636,753 | 4/1953 | Griffin | 29/447 X |
| 2,917,822 | 12/1959 | Boice | 29/447 |
| 2,926,030 | 2/1960 | Rozmus et al. | 228/115 X |
| 2,992,021 | 7/1961 | Nay | 285/381 X |
| 3,126,214 | 3/1964 | Wong et al. | 29/447 X |
| 3,326,581 | 6/1967 | Wong | 285/381 X |
| 3,336,054 | 8/1967 | Blount et al. | 285/381 X |
| 4,120,520 | 10/1978 | Ahistone | 285/381 X |

Primary Examiner—Charlie T. Moon
Attorney, Agent, or Firm—Browning, Bushman, Zamecki & Anderson

[57] ABSTRACT

A drill pipe is fabricated by forming a tubular tool joint with a pipe connection formation at one end. The other end of the tool joint is connected to one end of a tubular adapter by a threaded shrink grip connection. The other end of the adapter is connected to a first end of a tubular pipe body by welding. A second tool joint is similarly mounted on the second end of the pipe body by means of a second adapter.

8 Claims, 5 Drawing Figures

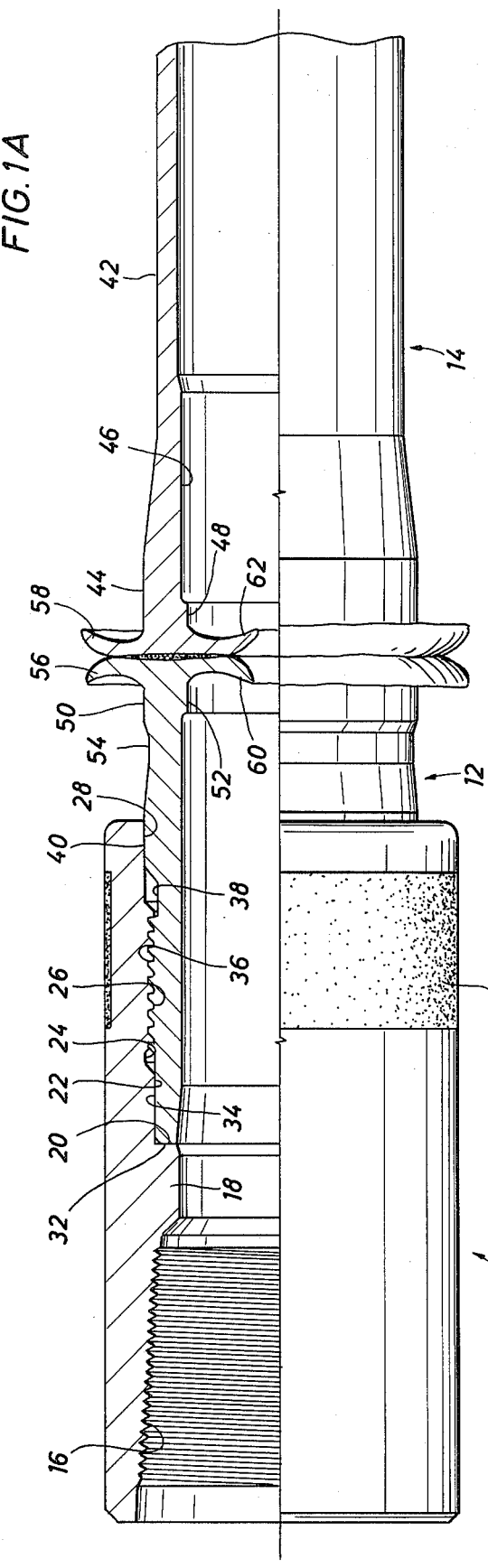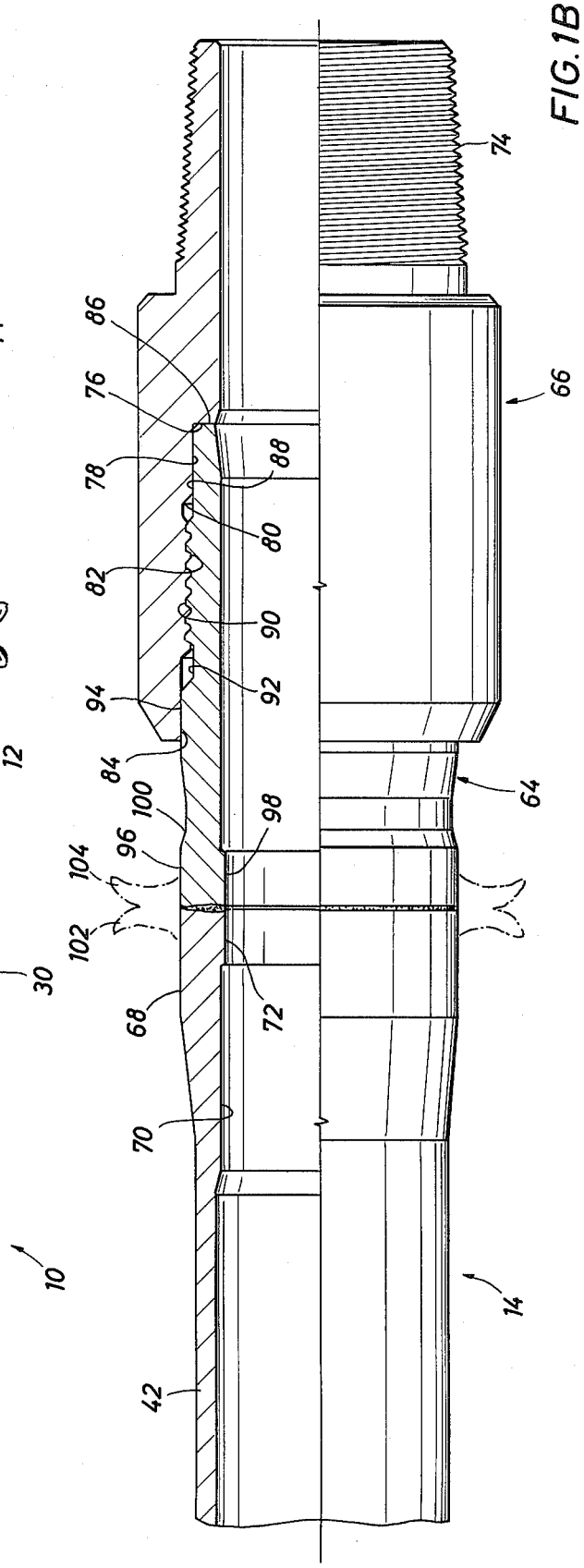

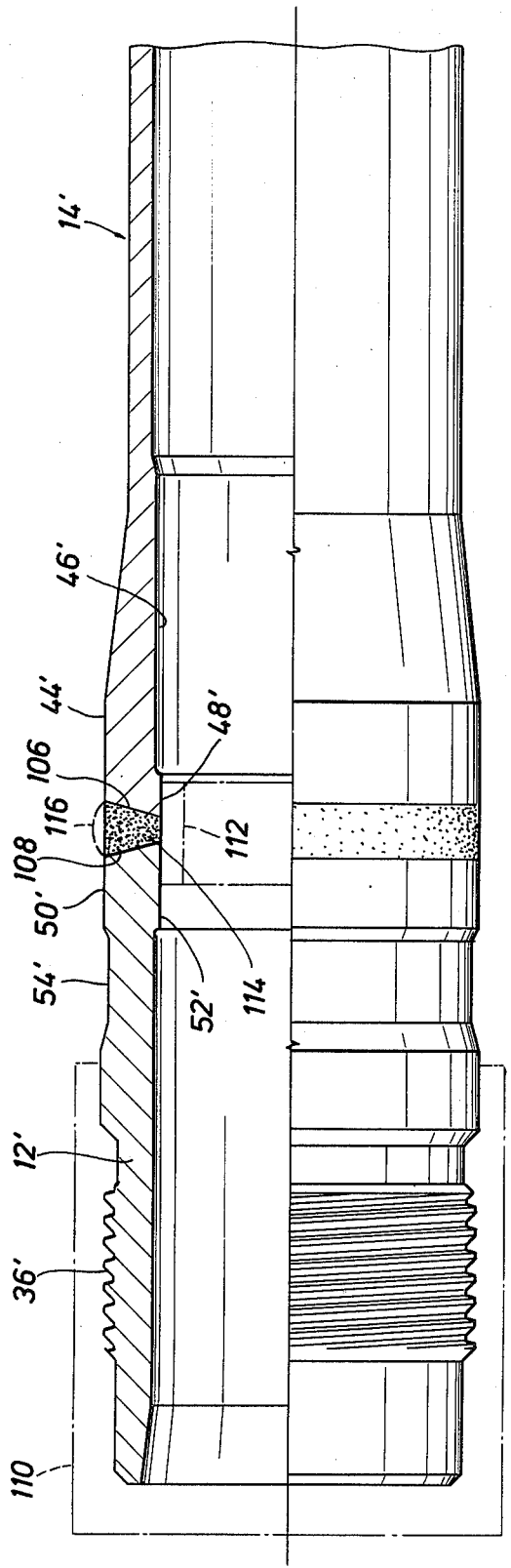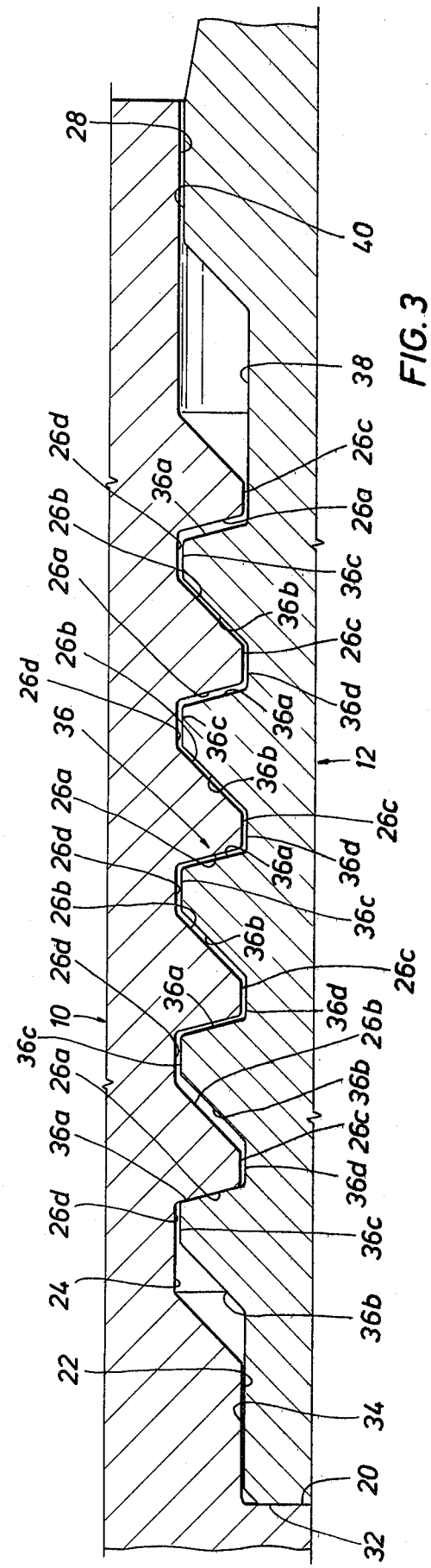

SHRINK GRIP DRILL PIPE FABRICATION METHOD

BACKGROUND OF THE INVENTION

The invention pertains to a drill pipe fabrication method, the resulting drill pipe, and an adapter member used in said method and drill pipe. Conventional drill pipe is formed in elongated sections, each section having pipe connections at both ends so that the drill pipe sections can be connected to one another in end-to-end relation to form a drill string. Typically, the pipe connections comprise tapered threads, each pipe section having a female connection or box at one end and a male connection or pin at the other end. Such drill pipe is used not only in apparatus for drilling wells of various types, but also in various types of mining or excavating devices, such as raise drills. While the well drilling equipment is typically designed to drill a relatively long but small diameter well bore, the mining equipment is typically used to form a shorter but relatively large diameter bore, such as a raise. The latter type of excavation is used, for example, in underground mines to connect tunnels located at different levels, and is necessarily of sufficiently large diameter to be used for moving various types of equipment and even personnel, from one level to the next.

Because of the substantial differences in the types, sizes, and environments of the bores which they are intended to form, there are numerous differences in these various types of drilling equipment. However, there are also certain similarities. The most significant, for present purposes, is the fact that each includes a drill bit which is supported by a string of drill pipe such as is described above. Likewise, while the dimensions, weight, and other parameters of the drill pipe may differ substantially depending upon the type of machine on which it is to be used, certain fabrication techniques have become conventional in the manufacture of virtually all types of drill pipe. More specifically, the end portions of the drill pipes which define the threaded pipe connections are known as "tool joints" and are frequently manufactured separately from the elongate central portion, which will be referred to herein as the "pipe body." The tool joints are then rigidly mounted on opposite ends of the pipe body by the manufacturer to form a complete section of drill pipe.

In the past, the most common technique for mounting the tool joints on the pipe bodies was through the use of threaded shrink grip connections. In this method the ends of the pipe body would be internally and/or externally upset so that threaded shrink grip formations could be machined thereon. Each tool joint would have one end machined to form a conventional threaded pipe connection for joining one section of drill pipe to another, while the other end would be machined to form a shrink grip type thread formation for cooperation with that of the pipe body. Assuming that the male shrink grip thread was formed on the pipe body, and the female shrink grip thread on the tool joint, the latter would be slightly undersized so that the connection between the two could not be made until the tool joint was heated sufficiently to cause a desired amount of thermal expansion. The joint thus heated would be threaded onto the pipe body and then quenched so that, as it cooled, it would shrink onto the pipe body upset, forming a tight, rigid, sealed connection.

This technique has several disadvantages. One of these is that the machining of the upset portion of the pipe body must be extremely precise. Thus, any machining errors or subsequent damage to the machined pipe body upset make it necessary to scrap the entire pipe body. This type of waste is quite expensive even if the error or damage occurs on the first end of the pipe body machined, and even more expensive if it occurs on the second end after the first has been properly finished. Furthermore, even without such errors and damage, such precise machining of a relatively large work piece such as a pipe body is in itself an expensive operation.

For these and other reasons, it has now become more common to weld the tool joints to the pipe body. As previously mentioned, the earlier pipe bodies designed to have the tool joints attached by shrink grip connections would be provided with upset end portions. Pipe bodies designed to have the tool joints attached by welding are also provided with upset end portions, but of a significantly smaller size. Due to the current predominance of welding tool joint connections, such small sizes have now become standard. Nevertheless, there are still a significant number of instances in which the shrink grip type tool joint is desired and requested by a customer. For example, this type of drill pipe may be preferred because, if the pipe body should fail, the tool joint can be more easily salvaged if it has been attached by the shrink grip method. However, since the smaller size pipe body upsets which have now become standard are too small to be machined for a proper shrink grip connection, it is necessary that pipe bodies having the larger, older style upsets be specially ordered and manufactured where a shrink grip tool joint is desired. Thus, it is difficult to provide such drill pipe at a reasonable cost.

SUMMARY OF THE INVENTION

The present invention provides a means by which a shrink grip type tool joint can be used with a conventional pipe body having the relatively small standard size upsets. This is done through the use of an intermediate piece or adapter which has one end machined for a shrink grip attachment to the tool joint and the other end configured for welding to a standard size upset on a pipe body. This not only solves the various problems mentioned above, but also allows a very high quality metal to be used in the adapter member without excessive cost.

The order of assembly may vary depending upon the type of welding technique to be used to attach the adapter to the pipe body. For example, with fusion welding, a well known process employing an electric arc, it may be preferable to first weld the adapter to the pipe body and subsequently shrink grip the tool joint onto the adapter. This is because, if the tool joint and adapter were joined prior to the fusion welding, the latter could excessively heat and thereby weaken the shrink grip connection between the tool joint and adapter.

On the other hand, where inertia or friction welding is used, it becomes practical to first shrink grip the tool joint onto the adapter and subsequently weld the resulting sub-assembly onto the pipe body. With this order of assembly, the tool joint itself covers and protects the shrink grip formations which have been machined on the adapter, so that it becomes unnecessary to provide other protection for these surfaces during the welding process.

In preferred forms of the invention, the shrink grip formations on the tool joint and adapter include not only mating thread sections, but also opposed lands at which tight seals are formed during the shrink grip connection process. Preferably, the shrink grip threads are sized so that no substantial radial shrink grip seals are formed in the threaded sections per se, but rather only at the aforementioned lands. The shrink grip threads themselves are preferably of the buttress type. This type thread not only has high shear strength, but also a relatively low ratio of axial to radial movement upon thermal expansion and contraction. This in turn allows for a smaller initial clearance between the two mating threads during assembly, and thus, for even greater thread cross-sectional area and strength.

Various types of welding processes which may be used to attach the adapter to the pipe body result in radial protuberances which must be machined off to properly finish the drill pipe. To facilitate such machining, the adapter preferably has an external necked down area generally adjacent the end adapted for welding to the pipe body.

Accordingly, it is a principal object of the present invention to provide a method of fabricating drill pipe using a shrink grip type tool joint and a pipe body having a standard size upset.

Another object of the present invention is to provide an improved drill pipe fabricated in accord with said method.

A further object of the invention is to provide such a drill pipe and method employing an adapter member having one end connected to a tool joint by a threaded shrink grip connection and the other end connected to a tubular pipe body.

Still another object of the present invention is to provide such a drill pipe and fabrication method wherein said other end of the adapter is welded to the pipe body.

Yet a further object of the invention is to provide an adapter for use in the aforementioned drill pipe and method.

Still other objects, features, and advantages of the present invention will be made apparent by the following detailed description, the drawings and the claims.

BRIEF DESCRIPTION OF THE DRAWINGS

FIG. 1A is a quarter-sectional view of one end of a drill pipe in the process of being formed in accord with the present invention.

FIG. 1B is a continuation of FIG. 1A showing the other end of the drill pipe in a completed state.

FIG. 2 is a quarter-sectional view of a second embodiment of the invention wherein the adapter is connected to the pipe body by a different type of welding process from that of the first embodiment.

FIG. 3 is an enlarged detail cross-sectional view through the shrink grip threads subsequent to make up but prior to quenching.

DETAILED DESCRIPTION OF PREFERRED EMBODIMENT

Figure 4:
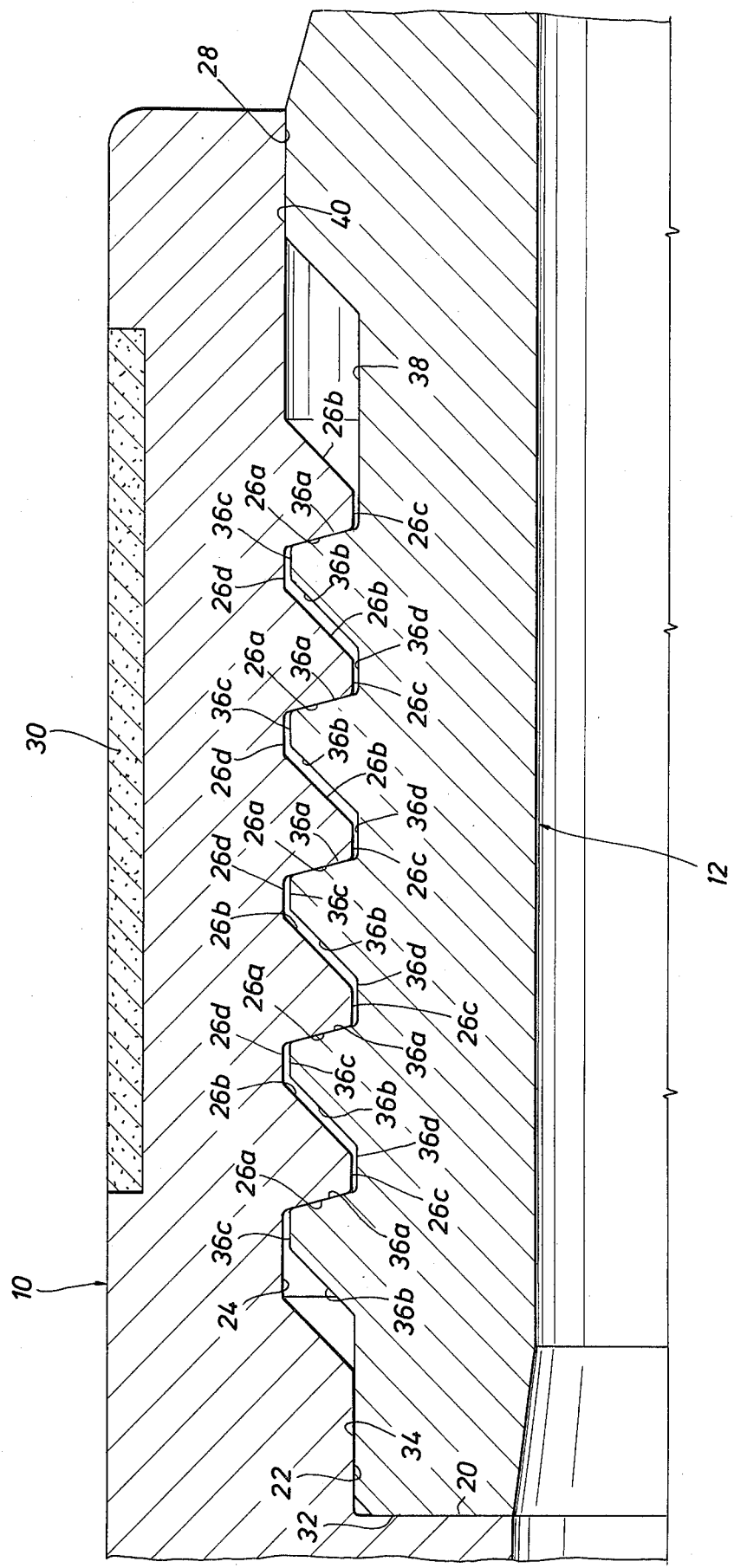
FIG. 4 is a view similar to that of FIG. 3 but showing the relative positions of the parts after quenching.

FIG. 1A illustrates one end of a drill pipe in the process of being formed in accord with a first embodiment of the present invention. That end of the drill pipe, i.e. the left hand end as viewed in the drawing, is comprised of three main parts, a tool joint body 10, an adapter 12, and a pipe body 14. The tool joint body 10 is generally tubular in form, having a cylindrical external configuration. One end of the tool joint body 10 is internally threaded to form a standard pipe connection in the form of a box 16 for connecting the drill pipe to another section of similar pipe. The other end of tool joint body 10, i.e. the right hand end as viewed in the drawing, is internally machined for a shrink grip type connection. More specifically, body 10 has an internal annular flange 18 extending radially inwardly and defining an annular shoulder 20 facing axially outwardly through the right hand end of body 10. Shoulder 20 is generally planar and perpendicular to the axis of body 10. Adjoining shoulder 20, axially outwardly thereof, is a cylindrical land area 22 facing radially into and partially defining the bore of body 10. Adjoining land 22 axially outwardly thereof is a relief area or groove 24, which in turn is adjoined by a section 26 of internal buttress type threads. Finally, axially outwardly of threads 26, body 10 is counterbored to form a second cylindrical land 28 facing radially inwardly. The right hand end of body 10 also includes an external annular inset of hard facing material 30.

Adapter 12 is also generally tubular in configuration, and because it is relatively small, may be formed of a very high quality metal without causing undue expense in the drill pipe as a whole. The left hand end of adapter 12 is externally machined to mate with the right hand end of tool joint body 10 in a shrink grip type connection. More specifically, the extreme left hand end surface of adapter member 12 forms a planar annular shoulder 32 sized to oppose shoulder 20 of body 10. Adjoining shoulder 32 axially inwardly thereof is an external cylindrical surface 34 which serves as a land for opposition to and abutment with land 22. Adjoining land 34 axially inwardly thereof is a section 36 of external buttress type threads for engagement with threads 26. Adjoining the axially inner end of thread section 36 is a relieved area or external groove 38. And finally, adjacent groove 38, adapter 12 has an external upset 40 having a cylindrical outer surface defining a land for opposition to and abutment with land 28.

Pipe body 14 includes an elongate cylindrical portion 42. The left hand end of pipe body 14 adjacent central portion 42 is externally upset as indicated at 44 to an enlarged outer diameter. The left hand end of pipe body 14 is likewise internally upset in successive increments as indicated at 46 and 48. These upsets are provided for the purpose of increasing the cross-sectional thickness of pipe body 14 in the end portion thereof so that a strong welded connection can be formed at that location. It should be noted that the specific upset configuration illustrated at 44, 46 and 48 is merely exemplary, and that various standard or commonly available pipe bodies may have other forms of internal and/or external upsets. However, in generaly, virtually all such standard upsets currently available are designed for friction welded connections, and therefore, are much shorter, and usually also thinner, than the older style upsets designed for shrink grip connections.

The right hand end of adapter member 12 is provided with external and internal upsets 50 and 52 respectively whose diameters match those of respective upsets 44 and 48 on pipe body 14 whereby said right hand end of adapter 12 is adapted for welding to the left hand end of pipe body 14. Between external upset or land 40 and external upset 50, adapter 12 has an external necked down area or shallow annular groove 54 for a purpose to be described more fully below.

To assemble the parts shown in FIG. 1A, tool joint body 10 and adapter member 12 are first connected to each other by a shrink grip process well known in the art. Briefly, the lands 22 and 28 on body 10 are slightly undersized, as machined, with respect to the corresponding male formations 34, and 40 on adapter 12. Thus, the connection between the left hand end of body 10 and the right hand end of adapter 12 cannot be made up with the parts in their original condition. However, by heating tool joint body 10 to cause a suitable amount of thermal expansion, it is possible to thread the tool joint body onto the adapter 12. With body 10 being maintained in a heated, and thus expanded, condition, rotation is continued until shoulders 32 and 20 are in abutment. Body 10 is then quenched or otherwise caused to cool so that it shrinks body axially and radially against adapter 12. This shrinking not only provides a rigid connection between body 10 and adapter 12, but also forms several fluid tight seals between the two members. The primary seal is formed between shoulders 32 and 20. Secondary seals are formed between the two sets of radially facing lands 22, 34 and 28, 40. The exact configuration and interrelationship of the shrink grip formations will be described more fully below.

The shrink grip formations must be very precisely machined to very close tolerances in order to provide for a sufficiently tight and rigid shrink grip connection but without the creation of excessive internal forces such as might cause failure or undue deformation of the parts. For the same reason, and also because the formations serve to seal as well as to connect the two members in question, it is necessary that a relatively smooth finish be provided at the seal areas, and that both these areas and the threads be protected from scratching and other damage after they have been machined. It can be seen that, once the shrink grip connection has been made up, the outer body 10 covers and protects the formations on the exterior of the inner member 12.

With tool joint body 10 and adapter 12 assembled, the right hand end of the adapter, including necked down area 54 and upsets 50 and 52, protrudes axially outwardly from the tool joint body 10. As previously mentioned, this protruding end is configured for welding to the left hand end of pipe body 14. In the embodiment shown in FIG. 1A, member 12 and body 14 are connected by a form of pressure welding known as inertia type friction welding. For this type welding, the opposed axially facing end surfaces of adapter 12 and pipe body 14 are finished so that they are planar and lie perpendicular to the axes of the respective parts.

In accord with well known practices, the pipe body 14 and the sub-assembly comprised of tool joint body 10 and adapter 12 are mounted in the welding machine in coaxial alignment and end-to-end relation. Body 10 and adapter 12 are held stationary, while pipe body 14 is rotated against adapter 12 at a high speed. The resulting frictional heating of the opposed ends of adapter 12 and pipe body 14 adjacent upsets 50, 52 and 44, 48 causes the metal in those areas to become deformable. Pipe body 14 is then urged axially toward adapter 12. This causes the aforementioned heated metal to deform, creating the characteristic "rams horn" formations 56, 58, 60 and 62, and also causing the metal to fuse together without the imposition of any third body of welding material. The metal is then cooled, and the rams horn configurations 56, 58, 60, 62 are machined away. The necked down area 54 facilitates the maching away of the external rams horn configurations 56 and 58 by providing clearance for the maching tool.

As mentioned above, because the tool joint body 10 is assembled with adapter 12 prior to the welding operation, there is no danger of physical marring of the external shrink grip formations on adapter 12. Because the heating of adapter 12 and pipe body 14 during the friction welding process is substantially confined to the abutting upset areas of those two members, there is relatively little danger of overheating of the shrink grip connection areas of adapter 12 and tool joint body 10 such as might damage the connection. During subsequent heat treatment, a cooling jacket or coil can easily be placed about tool joint body 10 to counteract any such tendency.

Referring now to FIG. 1B, the opposite end of the drill pipe from that of FIG. 1A is shown. This end, i.e. the right hand end of the drill pipe as shown in the drawing, comprises the right hand end of pipe body 14, an adapter 64, and a tool joint body 66. The right hand end of pipe body 14 is the mirror image of the left hand shown in FIG. 1A, and in particular, includes an external upset 68 and incremental internal upsets 70 and 72.

The tool joint body 66 has one end, i.e. its right hand end, machined to form a standard male pipe connection in the form of a tapered threaded pin 74. Pin 74 is sized to be received in a box such as 16 of FIG. 1A, but on an adjacent section of drill pipe, in use. The other or left hand end of tool joint body 66 is the mirror image of the right hand end of tool joint body 10, having identical shrink grip formations including: a planar, internal, annular shoulder 76 lying perpendicular to the axis of body 66 and facing axially outwardly through the left hand end of that body; a cylindrical, annular land surface 78 adjoining shoulder 76 and extending axially outwardly therefrom; an internal annular relief 80 adjoining land 78, a section 82 of internal buttress type threads extending axially outwardly from relief 80; and a second cylindrical internal land area 84 extending from threads 82 outwardly to the end of body 66.

Adapter 64 is identical to adapter 12, but oppositely arranged so as to form a mirror image of the latter. Briefly, its right hand end includes shrink grip formations for engagement with those of tool joint body 66, while its left hand end is adapted for welding to the upset right hand end of pipe body 14. The shrink grip formations of adapter 64 include an axially facing shoulder 86 defined by the extreme right hand end surface of adapter 64 and opposed to shoulder 76, an external or radially outwardly facing cylindrical land area 88 adjacent shoulder 86 and opposed to land 78, a section 90 of buttress type threads extending axially inwardly from land 88, an annular relief 92 adjoining the axially inner end of threads 90, and a second external cylindrical land area 94 formed by an external upset on adapter 64 and opposed to land 84 of tool joint body 66. The left hand end of adapter 64 has external and internal upsets 96 and 98 respectively, whose diameters correspond to upsets 68 and 72 of pipe body 14. Adjacent upset 96, adapter 64 has an external annular necked down area 100.

The parts shown in FIG. 1B are assembled in substantially the same manner as the corresponding parts of FIG. 1A. Briefly, tool joint body 66 is heated to cause a sufficient amount of thermal expansion to allow buttress threads 82 and 90 to be made up. With body 66 and adapter 64 thus threadedly connected, body 66 is quenched so that it shrinks onto the right hand end of adapter 64 forming a rigid, sealed, shrink grip connection. The upset or left hand end of adapter 64 protruding axially from tool joint body 66 is then welded to the right hand end of pipe body 14, and the resulting rams horn formations, two of which are shown at 102 and 104 in phantom, are machined away.

As explained above, of the various configurations which must be machined or otherwise formed on the parts of the drill pipe, the shrink pipe connection formations on the tool joint bodies and adapters are the most intricate, precisely controlled, and expensive to perform. By confining this precise machining to the relatively small tool joint bodies and adapters, the method of the present invention avoids the possibility of having to scrap an entire, relatively large, and therefore expensive, pipe body as would be necesary if the shrink grip connection were made directly between that body and the tool joints, and if a machining error or damage occurred to the shrink grip formations of the pipe body. In other words, by interposing the relatively small adapters between the tool joints and pipe body, potential expense is reduced since, if a machining error or damage does occur in the shrink grip formations, it will result in scrapping of only a relatively small part, not a large pipe body.

Expense is further reduced by virtue of the fact that standard pipe bodies, having standard welding sized upsets, are used. Nevertheless, a shrink grip connection is provided at the tool joint with all the advantages of such connections, including the possibility of salvaging the joint should the pipe fail, or the pipe should the joint fail. It should also be noted that, since the relatively small adapter can be formed of a superior quality material without undue expense, a more perfect shrink grip connection can be provided than would be possible if the shrink grip connections were made directly between the tool joint body and pipe body.

Other advantages result from the specific type of shrink grip formations employed. Referring to FIG. 3, portions of the shrink grip connection formations of tool joint body 10 and adapter 12 are shown in detail as they would appear after the tool joint body 10 has been heated and threaded onto the adapter 12. As previously noted, threads 26 and 36 are of the buttress type. As is well known in the art, a buttress thread is an asymmetrical type thread. Thus, the threads 26 of tool body 10 have opposite sides or flanks disposed at different inclinations with respect to the axis of that body. More specifically, threads 26 have load-bearing or pressure flanks 26a which are nearly perpendicular to the axis of the centerline of body 10, the opposite flanks 26b being more steeply inclined with respect to a perpendicular to said axis, more specifically at about 45°. The mating threads 36 of adapter 12 likewise have pressure flanks 36a which are nearly perpendicular to the centerline of adapter 12 and oppose pressure flanks 26a of body 10, and opposite flanks 36b which oppose flanks 26b of body 10. Threads 26 have crests 26c and roots 26d, threads 36 having crests 36c opposed to roots 26d and roots 36d opposed to crests 26c.

As is known in the art, the buttress type thread is particularly useful in a joint having relatively high axial loading in one direction. This is because the pressure flanks, 26a and 36a in the embodiment shown, being nearly perpendicular to the centerline, provide nearly direct opposition or resistance to the axial force, the radial component of the reaction force at the pressure flanks being minimized. At the same time, the relatively steep inclination of the non-load bearing sides or flanks 36b and 26b with respect to the perpendicular to the centerline allows the base portions of the threads to be made quite wide thereby providing high shear strength. It has been found that the buttress type thread has even further advantages when used in a shrink grip connection. This is because the buttress threads can be machined with less initial clearance between the threads of the two mating parts since the 45° angle of the non-load bearing flanks minimizes variations in the angle of inclination on thread expansion, and this in turn allows more metal or cross-sectional area in the threads, whereby their shear strength is maximized.

Still referring to FIG. 3, when body 10 has been heated and threaded onto adapter 12, but before it is quenched and shrunk, shoulders 20 and 32 are in abutment. Relatively small clearances are present between lands 22 and 34 and between opposed lands 28 and 40. There is an even greater clearance between the opposed roots and crests 26d, 36c and 36d, 26c of the buttress threads. The opposed pressure flanks 26a and 36a of the threads are in abutment over about the first full 360° adjacent lands 22 and 34, the clearance between them increasing toward lands 28 and 40 due to the axial thermal expansion of body 10. Conversely, the clearance between non-load bearing flanks 26b and 36b decreases from lands 22 and 34 toward lands 28 and 40, i.e. from left to right as viewed in the drawing.

FIG. 4 shows the same parts as FIG. 3 after quenching and shrinking of tool joint body 10. Since shoulders 20 and 32 were already in abutment prior to quenching, the subsequent shrinking of body 10 maintains these two shoulders in extremely tight axial engagement to form the primary seal between body 10 and adapter 12. The lands 22 and 34, between which there was a small clearance prior to quenching, are brought into engagement as body 10 shrinks radially to form a secondary radial seal. A similar radial seal is formed between lands 28 and 40 at the opposite end of threads 26 and 36 from lands 22 and 34. By virtue of the axial shrinkage of body 10, pressure flanks 26a and 36a of the buttress threads are brought into firm engagement along their entire lengths, resulting in clearance between non-load bearing flanks 26b and 36b along their entire lengths. Likewise, there are radial clearances between crests 36c and roots 26d and between crests 26c and roots 36d. In other words, discounting the relatively small radial load bearing capacity between the slightly inclined pressure flanks 26a and 36a, there are no substantial radial shrink grip seals formeded between the threads 26 and 36. The initial clearances between non-pressure flanks 26b and 36b, i.e. after heating but prior to quenching, are large enough to compensate the difference in pitch due to heating the tool joint before shrinking. The clearances between the threaded sections of the two members enhance the possibility of disassembling the shrink grip connection and salvaging one part of a drill pipe in which the other part has failed.

Referring finally to FIG. 2, there is shown a modification of the embodiment of FIGS. 1A and 1B employing fusion welding, rather than inertia welding. FIG. 2 shows the left hand end of a pipe body 14' similar to pipe body 14 of FIG. 1A and including a similar external upset 44' and internal upsets 46' and 48'. The pipe body 14' differs from pipe body 14 in that its extreme left hand end surface 106 is not planar, but rather, is beveled to prepare it for the fusion welding process. The end of pipe body 14' shown in FIG. 2 is, in accord with the present invention, welded to the right hand end of an adapter 12'. Adapter 12' is virtually identical to adapter 12 of FIG. 1A, and in particular, its right hand end includes upsets 50' and 52' whose diameters correspond to upsets 44' and 48' of the pipe body. However, the extreme right hand end surface 108 of adapter 12' is beveled so that, when it is opposed to surface 106 of pipe body 14', the two surfaces flare radially outwardly away from each other. Adapter 12' also includes external shrink grip formations, including buttress threads 36', as well as an external necked down area 54' adjacent upset 50'.

Because fusion welding will tend to heat the entire adapter 12', including the area on which the shrink grip formations are machined, it is preferable that the fusion welding process be performed first on adapter 12' and pipe body 14' to connect them, followed by the shrink grip connection process by which a suitable tool joint body is connected to the left hand end of adapter 12'. Accordingly, a sleeve-like shield is placed over the shrink grip formations of adapter 12', as indicated in phantom 110, to protect the precisely machined shrink grip formations during the welding process. As is well known in the art, the fusion welding process involves mounting of the two members to be welded, in this case pipe body 14' and adapter 12', in coaxial alignment and with their end surfaces 106 and 108 spaced apart by a desired amount. An annular ferrule is placed within the tubular members 12' and 14' in the position indicated in phantom at 112 to back up the gap between the ends 106 and 108 of the two members. A stick or wire electrode is placed about the outside of members 12' and 14' adjacent the juncture or gap therebetween. As the pipe rotates during the welding process, the electrode flows into and fills the gap between surfaces 106 and 108 to form a weld 114. Initially, this weld includes an external protuberance or cap pass 116 which is machined away after the welding process is completed. Such machining is facilitated by external necked down area 54' of adapter 12'. The internal back-up ferrule 112 and inner portion of the weld 114 are also machined away or bored out of the connected members 12' and 14' after the welding process. This internal boring is facilitated by internal upsets 52' and 48'. Finally, protector 110 is removed from adapter 12' and the left hand end of the adapter is connected to a tool joint body by a shrink grip connection as described above in connection with FIGS. 1A and 1B. The opposite end of pipe body 14' would have an adapter welded thereto, and then, a tool joint body connected to the adapter by a shrink grip connection in like manner to form a complete section of drill pipe.

Numerous modifications of the preferred embodiments described above can be made within the spirit of the invention. For example, the method of the present invention can be adapted for the use of welding processes other than inertia welding and fusion welding, as well as for any technique other than welding which may be desired for connecting the adapter to the pipe body. Other modifications may be made in the type of shrink grip connection employed. For example, in the embodiments shown, the primary seal is formed between two axially facing shoulders. However, in other embodiments, the primary seal or seals may be between radially facing surfaces. Likewise, the configuration of the shrink grip formations may be varied, e.g. to include other types of thread profiles. Still other modifications will suggest themselves to those of skill in the art. Accordingly, it is intended that the scope of the invention be limited only by the claims which follow.

We claim:

1. A method of fabricating drill pipe comprising the steps of:
    forming a first tubular tool joint body having a threaded pipe connection formation at one end;
    connecting the other threaded end of said first tool joint body to one threaded end of a first tubular adapter member by a threaded shrink grip connection;
    connecting the other end of said first adapter member to a first end of a tubular pipe body by welding;
    forming a second tubular tool joint body having a threaded pipe connection formation at one end;
    connecting the other threaded end of said second tool joint body to one threaded end of a second tubular adaptor member by a threaded shrink grip connection;
    and welding the other end of said second adaptor member to a second end of said pipe body opposite said first end, whereby said drill pipe may be threadably connected to other threaded drill pipes.

2. The method of claim 1 wherein said first adapter member and said first tool joint body have respective opposed axially facing annular shoulders; and wherein said connecting of said first tool joint body to said first adapter member includes forming a primary seal between said shoulders.

3. The method of claim 2 wherein said first tool joint body and said first adapter member have at least one set of respective opposed radially facing annular lands and wherein said connecting of said first tool joint body to said first adapter member includes forming a secondary seal between said lands.

4. The method of claim 3 wherein said shrink grip connection includes mating threaded sections on said first tool joint body and said first adapter member; wherein there are two such sets of lands disposed at respective opposite ends of said threaded sections; and wherein said connecting of said first tool joint body to said first adapter member includes forming secondary seals between each of said two sets of lands.

5. The method of claim 4 wherein said connecting of said first tool joint body to said first adapter member is performed without the formation of substantial radial shrink grip seals within said threaded sections.

6. The method of claim 1 wherein said welding is pressure type welding and is performed after said connecting of said first tool joint body to said first adapter member.

7. The method of claim 1 wherein said welding is fusion type welding and is performed prior to said connecting of said first tool joint body to said first adapter member.

8. The method of claim 1 wherein said first adapter member is connected to said first tool joint body and to said pipe body at respective positions such that said first tool joint body and said pipe body are longitudinally spaced apart by said first adapter member.

* * * * *